(12) United States Patent
Takemoto et al.

(10) Patent No.: US 11,814,105 B2
(45) Date of Patent: Nov. 14, 2023

(54) BODY SIDE PANEL

(71) Applicant: NISSAN MOTOR CO., LTD., Yokohama (JP)

(72) Inventors: Shinichiro Takemoto, Kanagawa (JP); Naoya Matsuoka, Kanagawa (JP); Toshikazu Torigaki, Kanagawa (JP); Shinya Mihara, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 37 days.

(21) Appl. No.: 17/603,406

(22) PCT Filed: Apr. 15, 2019

(86) PCT No.: PCT/IB2019/000416
§ 371 (c)(1),
(2) Date: Oct. 13, 2021

(87) PCT Pub. No.: WO2020/212717
PCT Pub. Date: Oct. 22, 2020

(65) Prior Publication Data
US 2022/0212722 A1 Jul. 7, 2022

(51) Int. Cl.
*B62D 25/02* (2006.01)
*B62D 29/00* (2006.01)
(Continued)

(52) U.S. Cl.
CPC ........... *B62D 25/02* (2013.01); *B62D 25/025* (2013.01); *B62D 25/04* (2013.01); *B62D 25/06* (2013.01);
(Continued)

(58) Field of Classification Search
CPC ...... B62D 25/025; B62D 25/04; B62D 25/06; B62D 27/023; B62D 29/001; B62D 29/004; B62D 29/008
(Continued)

(56) References Cited

U.S. PATENT DOCUMENTS 5,443,297 A * 8/1995 Tanaka ............... B62D 25/2036
296/203.03
2001/0020794 A1 9/2001 Ishikawa
(Continued)

FOREIGN PATENT DOCUMENTS

DE 10 2007 025 930 A1 12/2008
EP 2671779 A1 * 12/2013 ............. B62D 23/00
(Continued)

*Primary Examiner* — Dennis H Pedder
(74) *Attorney, Agent, or Firm* — Foley & Lardner LLP

(57) ABSTRACT

Provided is a body side panel body side panel (BP) including one metal panel (P1); another metal panel (P2) that forms a space (A) between the one metal panel (P1) and the other metal panel (P2); a resin member (R) that is molded integrally with the one metal panel (P1). The resin member (R) includes link ribs (11A, 11B, 12A, and 12B) that continuously extend respectively along a front edge and a rear edge of a center pillar portion (CP), and along an upper edge and a lower edge of a sill portion (SL), and includes a lower intersection rib (14) that is arranged in an intersection region where a lower end portion of the center pillar portion (CP) and the sill portion (SL) intersect with each other. A clearance (S1) from a distal end portion of each of the link ribs (11A, 11B, 12A, and 12B) to the other metal panel (P2) is smaller than a clearance (S2) from a distal end portion of the intersection rib (14) to the other metal panel (P2). Impact energy in case of side collision is released in two steps. With this, an impact absorbing function is enhanced.

13 Claims, 16 Drawing Sheets

(51) Int. Cl.
  *B62D 25/06*  (2006.01)
  *B62D 27/02*  (2006.01)
  *B62D 25/04*  (2006.01)

(52) U.S. Cl.
  CPC ......... *B62D 27/023* (2013.01); *B62D 29/001* (2013.01)

(58) Field of Classification Search
  USPC .................... 296/209, 23.01, 3, 210, 29, 30
  See application file for complete search history.

(56) References Cited

U.S. PATENT DOCUMENTS

| | | |
|---|---|---|
| 2010/0187865 A1 | 7/2010 | Malek et al. |
| 2017/0015357 A1 | 1/2017 | Mukainakano et al. |
| 2018/0029644 A1 | 2/2018 | Li et al. |

FOREIGN PATENT DOCUMENTS

| | | |
|---|---|---|
| JP | 2010-168040 A | 8/2010 |
| JP | 2011-110971 A | 6/2011 |
| JP | 2017-019428 A | 1/2017 |

\* cited by examiner

BODY SIDE PANEL

TECHNICAL FIELD

The present invention relates to body side panels for automobiles. More specifically, the present invention relates to a body side panel including one metal panel and another metal panel that are reinforced with a resin member.

BACKGROUND ART

As an example of related-art body side panels, there is a body side panel disclosed under the title "IMPACT ENERGY ABSORBING STRUCTURE FOR VEHICLE" in Patent Literature 1. The body side panel disclosed in Patent Literature 1 has a structure including a center pillar portion in which an impact absorbing member is arranged between an outer panel and an inner panel. The impact absorbing member includes a plurality of ribs combined in matrix with each other, and is fixed to the inner panel with the ribs oriented to a side where the outer panel is present.

The ribs of this impact absorbing member include ones that have a main surface oriented in a front-and-rear direction and that are arranged at equal intervals, and other ones that have another main surface oriented in an upper-and-lower direction and that are arranged at equal intervals. With this, in case of side collision, impact energy is absorbed by deformation of the ribs.

CITATION LIST

Patent Document

Patent Document 1: Japanese Patent Application Laid-open No. 2017-019428

SUMMARY OF INVENTION

Technical Problem

However, in the related-art body side panel as described above, due to the structure in which the impact absorbing member including the plurality of ribs at equal intervals is arranged in the center pillar, in case where a vehicle body has started to be deformed by the side collision, the outer panel unevenly strikes against the ribs. Thus, an advantage of absorbing impact may not be sufficiently implemented, and hence further improvement of enhancing an impact absorbing function has been demanded.

The present invention has been made in view of the circumstances in the related art as described above, and an object thereof is to enhance an impact absorbing function of a lightweight body-side panel including metal panels that are reinforced with a resin member.

Solution to Problem

According to the present invention, there is provided a body side panel including a center pillar portion that extends in a body upper-and-lower direction, a sill portion that extends in a body front-and-rear direction across a lower end portion of the center pillar portion, the body side panel including:
one metal panel that forms one main surface of the body side panel;
another metal panel that forms another main surface of the body side panel, and
that forms a space between the one metal panel and the other metal panel; and a resin member that is molded integrally with the one metal panel in the space.
The resin member of this body side panel includes, as ribs that protrude from a side where the one metal panel is present to a side where the other metal panel is present,
a link rib that continuously extends along a front edge of the center pillar portion,
another link rib that continuously extends along a rear edge of the center pillar portion,
a still-another link rib that continuously extends along an upper edge of the sill portion through an intersection region where the upper edge and the lower end of the center pillar portion intersect with each other,
a yet-another link rib that continuously extends along a lower edge of the sill portion through the intersection region where the lower edge and the lower end of the center pillar portion intersect with each other, and
a lower intersection rib that is arranged in the intersection region where the lower end portion of the center pillar portion and the sill portion intersect with each other.
In addition, in the body side panel, a clearance from a distal end portion of each of the link rib, the other link rib, the still-another link rib, and the yet-another link rib to the other metal panel is smaller than a clearance from a distal end portion of the lower intersection rib to the other metal panel.

Advantageous Effects of Invention

In the body side panel, in case of side collision, due to a structure of a vehicle body, high impact energy is applied mainly in a lower range of the center pillar portion. As a countermeasure, in the body side panel according to the present invention, the resin member integrated with the one metal panel includes the link ribs that continuously extend respectively along the front edge and the rear edge of the center pillar portion, and along the upper edge and the lower edge of the sill portion through the intersection region where the upper edge and the lower edge intersect with the lower end of the center pillar portion. In other words, the link ribs of the resin member are arranged continuously along a frame including the center pillar portion and the sill portion, that is, form what is called a monocoque structure. In addition, the clearance from the distal end portion of each of the link ribs of the resin member to the other metal panel is set smaller than the clearance from the distal end portion of the intersection rib to the other metal panel.

Thus, in case where the body side panel of the present invention receives impact from an outside, an entirety of the body side panel receives energy of the impact, and both the metal panels are deformed. In conjunction therewith, the link ribs nearer the other metal panel deform or collapse first by striking against the other metal panel so as to primarily absorb the impact energy. Then, in the body side panel, the intersection rib of the resin member deforms or collapses by striking against the other metal panel so as to secondarily absorb the impact energy.

In such a way, the body side panel according to the present invention, which is provided as the lightweight body-side panel including the metal panels that are reinforced with the resin member, absorbs the impact energy by the side collision in two steps. With this, the impact absorbing function can be enhanced.

DESCRIPTION OF THE EMBODIMENTS

First Embodiment

Figure 1:
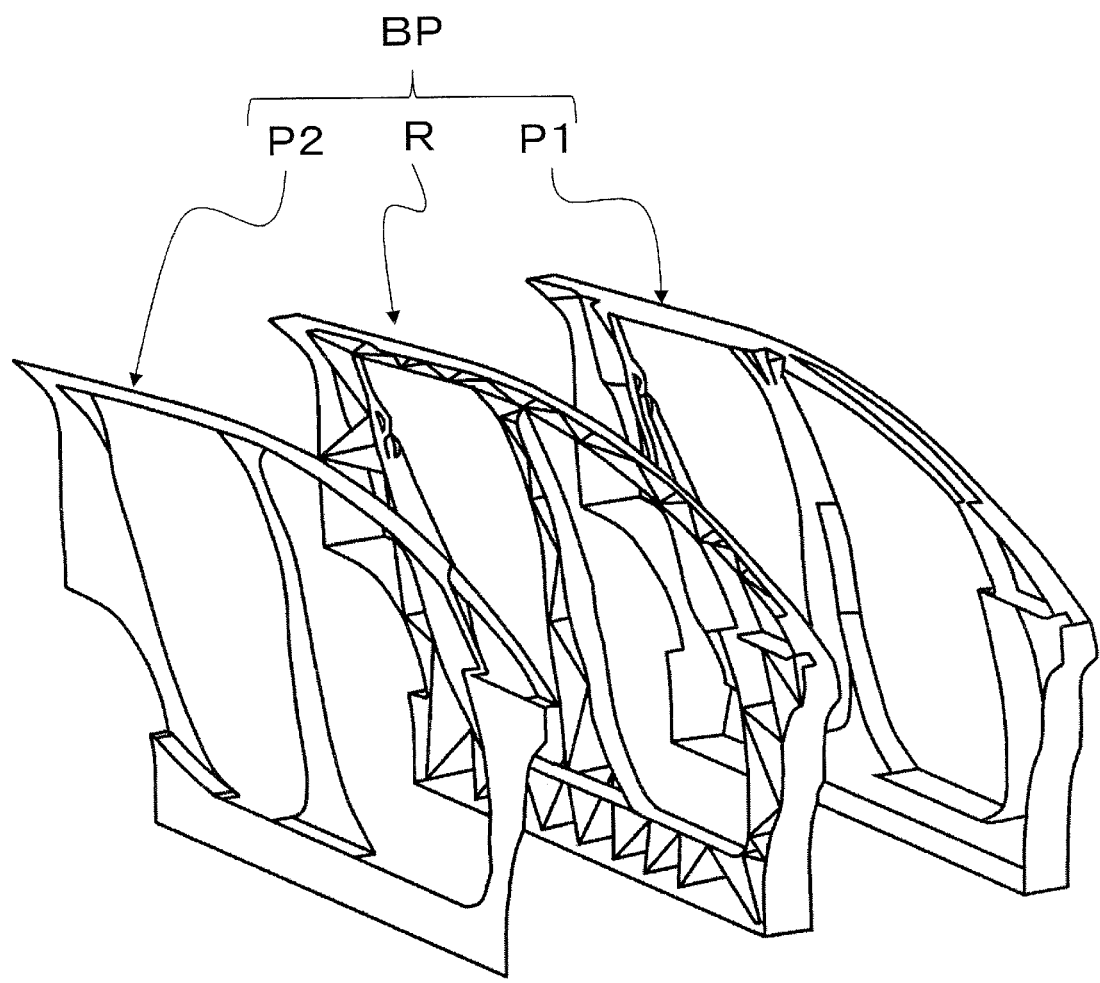
FIG. 1 is an explanatory exploded-perspective view of a body side panel.

A body side panel BP illustrated in FIG. 1 includes one metal panel (outer panel) P1 that forms one main surface of the body side panel BP, another metal panel (inner panel) P2 that forms another main surface of the body side panel BP and that forms a space between the one metal panel and the other metal panel, and a reinforcing resin member R that is molded integrally with the one metal panel P1 in this space.

Although materials of the metal panels P1 and P2 are not limited, as an example, these metal panels are each made of an aluminum alloy that is advantageous in weight reduction, and are molded into a predetermined three-dimensional shape by pressing of a blank material. Then, the metal panels P1 and P2 are joined to each other later by a step of spot welding or the like, and constitute the body side panel BP cooperatively with the resin member R.

Although a material of the resin member R is not limited, this resin member is a thermoplastic resin (CFRTP) containing discontinuous carbon fiber as a reinforcing material, and can be molded integrally with the one metal panel P1 by injection molding or resin-press molding. The resin member R integrally includes a large number of reinforcing ribs that are formed out of welding spots and the like on a main surface of the one metal panel P1, the main surface facing the other metal panel P2, and that protrude to a side where the other metal panel P2 is present.

Figure 2:
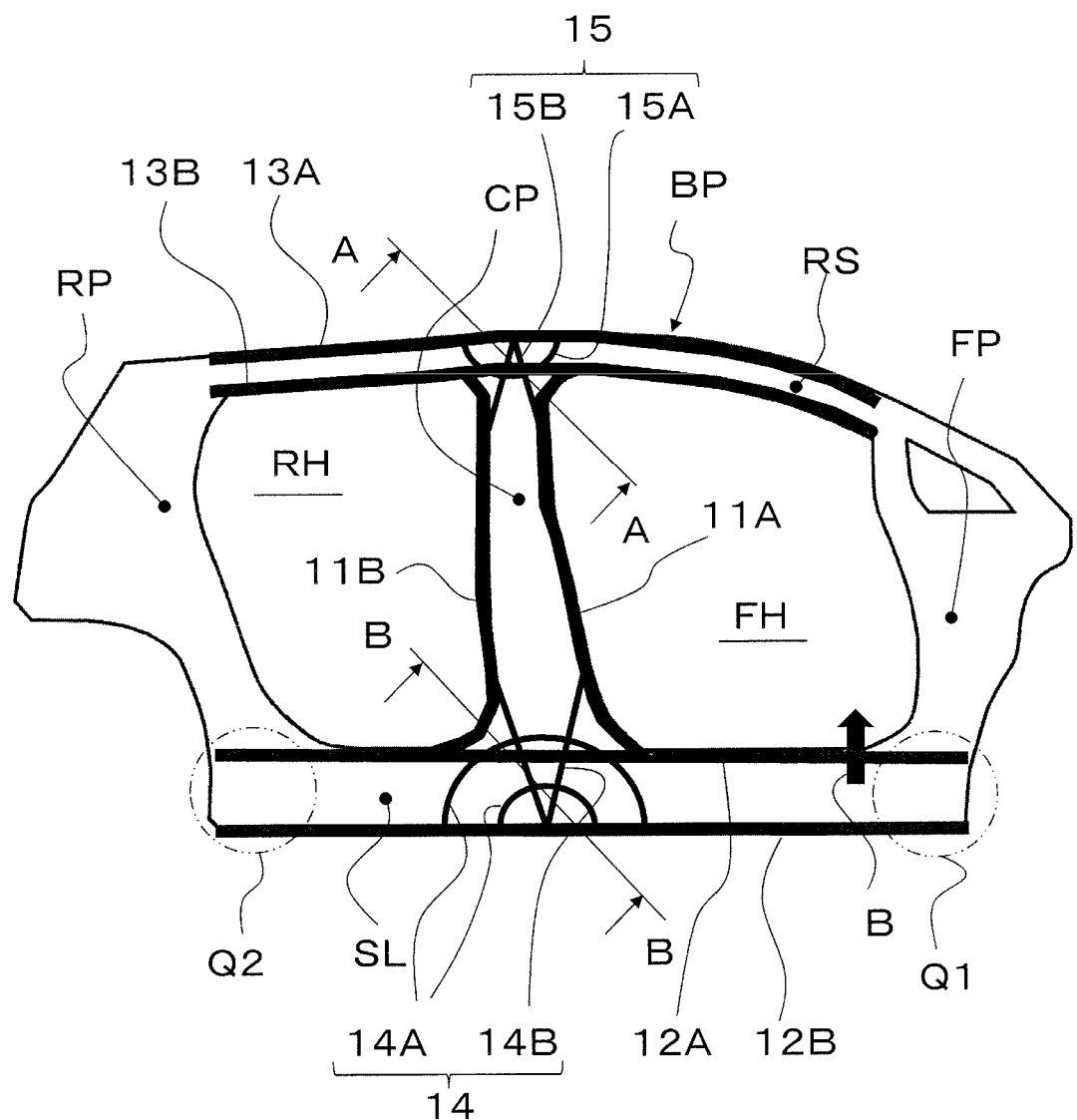
FIG. 2 is an explanatory side view of an arrangement of main ones of ribs in the body side panel according to the present invention.

As illustrated in FIG. 2, the body side panel BP according to this embodiment integrally includes a center pillar portion CP that extends in a body upper-and-lower direction, a sill portion SL that extends in a body front-and-rear direction across a lower end portion of the center pillar portion CP, and a roof side portion RS that extends in the body front-and-rear direction across an upper end portion of the center pillar portion CP.

Further, the body side panel BP integrally includes a front pillar portion FP that is arranged between a front end of the roof side portion RS and a front end of the sill portion SL and that extends in the body upper-and-lower direction, and a rear pillar portion RP that is arranged between a rear end of the roof side portion RS and a rear end of the sill portion SL and that extends in the body upper-and-lower direction.

Still further, the body side panel BP includes, respectively in front of and behind the center pillar portion CP, a front opening portion FH in which a front door is arranged, and a rear opening portion RH in which a rear door is arranged. In other words, the body side panel BP has a frame-like structure as a whole. Note that, although the resin member R includes the large number of ribs as illustrated in FIG. 1, for ease of understanding, FIG. 2 illustrates, of the ribs, main ones that relate to the present invention.

The resin member R that constitutes the body side panel BP includes, as the ribs that protrude from a side where the one metal panel P1 is present to the side where the other metal panel P2 is present, a pillar front-link rib 11A and a pillar rear-link rib 11B that continuously extend respectively along a front edge and a rear edge of the center pillar portion CP, and a sill upper-link rib 12A and a sill lower-link rib 12B that continuously extend respectively along an upper edge and a lower edge of the sill portion SL through an intersection region where these edges and the lower end portion of the center pillar portion CP intersect with each other. In other words, the sill upper-link rib 12A and the sill lower-link rib 12B traverse this intersection region. Note that, the sill upper-link rib 12A and the sill lower-link rib 12B continuously extend over a range from a lower end portion of the front pillar portion FP to a lower end portion of the rear pillar portion RP via the lower end portion of the center pillar portion CP.

Further, the resin member R includes, as the ribs that protrude from the side where the one metal panel P1 is present to the side where the other metal panel P2 is present, a roof upper-link rib 13A and a roof lower-link rib 13B that continuously extend respectively along an upper edge and a lower edge of the roof side portion RS through an intersection region where these edges and the upper end portion of the center pillar portion CP intersect with each other. Note that, the pillar front-link rib 11A and the pillar rear-link rib 11B have upper end portions that are continuous with the roof lower-link rib 13B, and have lower end portions that are continuous with the sill upper-link rib 12A.

Still further, the resin member R includes a lower intersection rib 14 that is arranged in the intersection region where the lower end portion of the center pillar portion CP and the sill portion SL intersect with each other, and an upper intersection rib 15 that is arranged in the intersection region where the upper end portion of the center pillar portion CP and the roof side portion RS intersect with each other.

The lower intersection rib 14 and the upper intersection rib 15 include an at least one circular-arc intersection rib 14A and an at least one circular-arc intersection rib 15A each having a convex curved surface on a side where the center pillar portion CP is present, and an at least one straight intersection rib 14B and an at least one straight intersection rib 15B each arranged radially from a center of the convex curved surface. The lower intersection rib 14 of this embodiment includes two circular-arc ribs 14A and 14A that are concentric with each other around a sill lower side being a center of the circular arc, and two straight intersection ribs 14B and 14B.

Meanwhile, the upper intersection rib 15 includes a single circular-arc rib 15A around an upper side being a center of the circular arc, and two straight-intersection ribs 15B and 15B. These intersection ribs 14 (14A and 14B) and 15 (15A and 15B) intersect not only with each other, but also with the sill upper-link rib 12A or the roof upper-link rib 13A.

Figure 3:
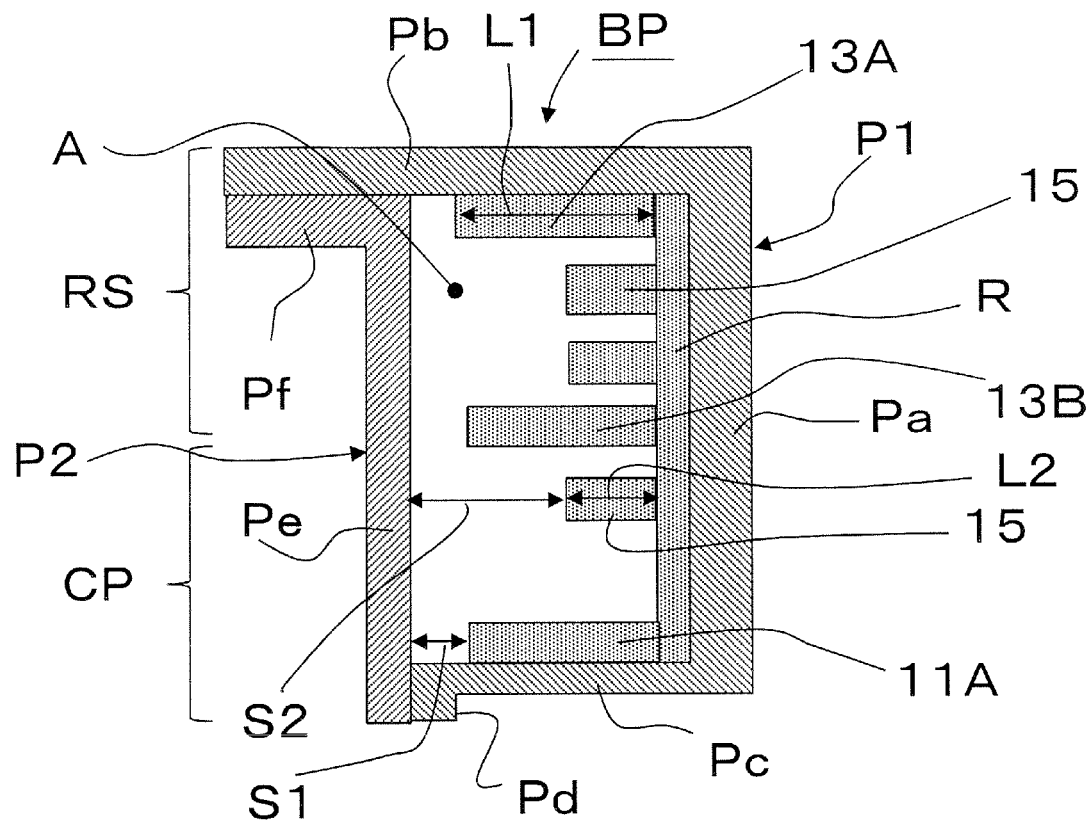
FIG. 3 is a cross-sectional view of a first embodiment, which is taken along arrows A-A in FIG. 2.
Figure 4:
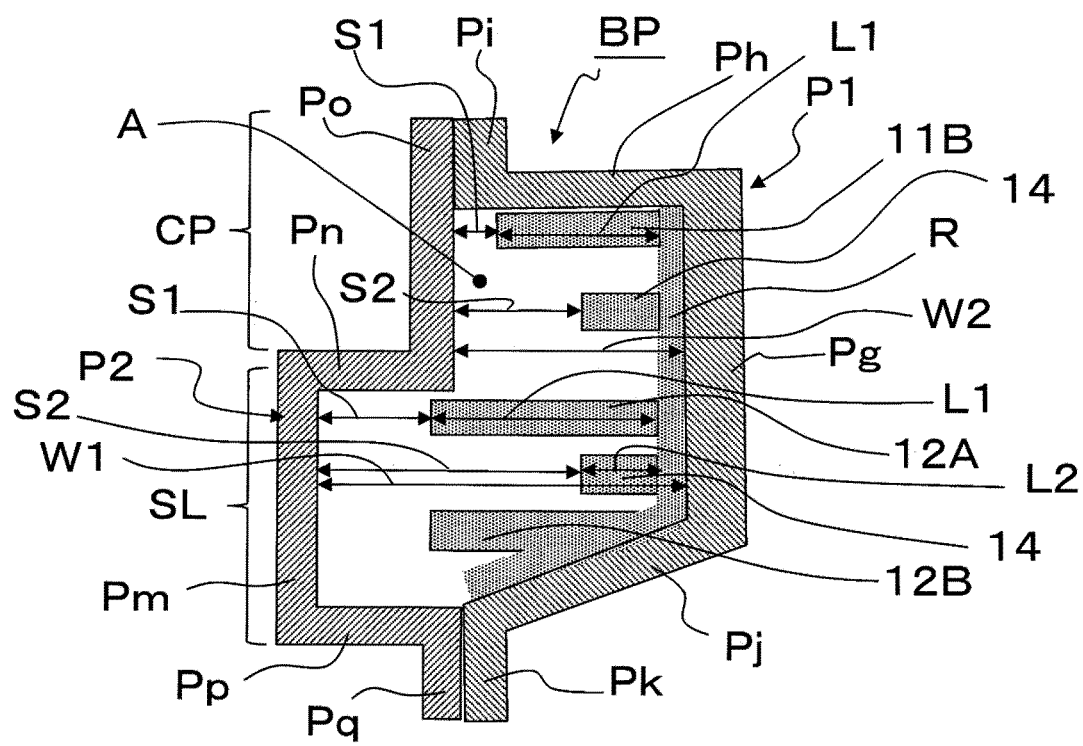
FIG. 4 is another cross-sectional view of the first embodiment, which is taken along arrows B-B in FIG. 2.

FIG. 3 is a cross-sectional view taken along arrows A-A in FIG. 2, that is, a cross-sectional view of the intersection region where the roof side portion RS and the center pillar portion CP intersect with each other. A cross-section of the roof side portion RS and a cross-section of the center pillar portion CP appear above and below. FIG. 4 is another cross-sectional view taken along arrows B-B in FIG. 2, that is, a cross-sectional view of the intersection region where the center pillar portion CP and the sill portion SL intersect with each other. The cross-section of the center pillar portion CP and a cross-section of the roof side portion RS appear above and below.

In the cross-section illustrated in FIG. 3, the one metal panel P1 has a cross-sectional shape that is opened to the side where the other metal panel P2 is present. Specifically, the one metal panel P1 includes a vertical wall portion Pa on an outer side of a vehicle body (on the right in the illustration), an upper wall portion Pb that extends from an upper end of the vertical wall portion Pa to an inner side of the vehicle body, a lower wall portion Pc that extends from a lower end of the vertical wall portion Pa to the inner side of the vehicle body, and a hanging wall portion Pd that continuously extends downward from a distal end of the lower wall portion Pc.

In the cross-section illustrated in FIG. 3, the other metal panel P2 includes a vertical wall portion Pe, and an upper wall portion Pf that extends from an upper end of the vertical wall portion Pe to the inner side of the vehicle body.

In the cross-section illustrated in FIG. 3, the one metal panel P1 and the other metal panel P2 are joined to each other. Specifically, the upper wall portion Pf of the other metal panel P2 is joined to a lower surface on a distal end side of the upper wall portion Pb of the one metal panel P1, and a lower end portion of the vertical wall portion Pe of the other metal panel P2 is joined to the droop wall portion Pd of the one metal panel P1. With this, a space A is formed between the one metal panel P1 and the other metal panel P2 that have been joined to each other.

In the cross-section illustrated in FIG. 4, the one metal panel P1 has a cross-sectional shape that is opened to the side where the other metal panel P2 is present. Specifically, the one metal panel P1 includes a vertical wall portion Pg on the outer side of the vehicle body (on the right in the illustration), an upper wall portion Ph that extends from an upper end of the vertical wall portion Pg to the inner side of the vehicle body, and an upper flange portion Pi that continuously extends upward from a distal end of the upper wall portion Ph. In addition, the one metal panel P1 includes a lower wall portion Pj that extends from a lower end of the vertical wall portion Pg obliquely to the inner side of the vehicle body, and a lower flange portion Pk that continuously extends downward from a distal end of the lower wall portion Pj.

In the cross-section illustrated in FIG. 4, the other metal panel P2 has a cross-sectional shape that is opened to the side where the one metal panel P1 is present. Specifically, the other metal panel P2 includes a vertical wall portion Pm on the inner side of the vehicle body (on the left in the illustration), an upper wall portion Pn that extends from an upper end of the vertical wall portion Pm to the outer side of the vehicle body, and an upper flange portion Po that continuously extends upward from a distal end of the upper wall portion Pn. In addition, the other metal panel P2 includes a lower wall portion Pp that extends from a lower end of the vertical wall portion Pm to the outer side of the vehicle body, and a lower flange portion Pq that continuously extends downward from a distal end of the lower wall portion Po.

Note that, in the body side panel BP, a range of the vertical wall portion Pm, the upper wall portion Pn, and the lower wall portion Pp of the other metal panel P2 correspond to the sill portion SL. In addition, in a structure of the body side panel BP of this embodiment, a clearance W1 between the one metal panel P1 and the other metal panel P2 in the sill portion SL (width of the space A) is larger than a clearance W2 between the one metal panel P1 and the other metal panel P2 in the center pillar portion CP.

In the cross-section illustrated in FIG. 4, the one metal panel P1 and the other metal panel P2 are joined to each other. Specifically, the upper flange portion Po and the lower flange portion Pq of the other metal panel P2 are joined respectively to the upper flange portion Pi and the lower flange portion Pk of the one metal panel P1. With this, the space A is formed between the one metal panel P1 and the other metal panel P2 that have been joined to each other. The space A communicates all over the body side panel BP, and the resin member R is molded integrally with the one metal panel P2 that constitutes one side of the body side panel BP (outer side of the vehicle body).

In addition, as illustrated in FIG. 3 and FIG. 4, in the structure of the body side panel BP of this embodiment, a clearance S1 from a distal end portion of each of the link ribs (11A, 11B, 12A, 12B, 13A, and 13B) to the other metal panel P2 is smaller than a clearance S2 from a distal end portion of each of the intersection ribs (14 and 15) to the other metal panel P2. In other words, the ribs each include its proximal end portion on a side where the vertical wall portions Pa and Pg of the one metal panel P1 are present. Thus, in this structure, a protrusion dimension L1 of each of the link ribs is larger than a protrusion dimension L2 of each of the intersection ribs.

More specifically, as illustrated in FIG. 3, on a side where the roof side portion RS is present, the clearance S1 from the distal end portion of each of the roof upper-link rib 13A, the roof lower-link rib 13B, and the pillar front-link rib 11A to the other metal panel P2 is smaller than the clearance S2 from the distal end portion of the upper intersection rib 15 to the other metal panel P2. In addition, as illustrated in FIG. 4, on a side where the sill portion SL is present, the clearance S1 from the distal end portion of each of the pillar rear-link rib 11B, the sill upper-link rib 12A, and the sill lower-link rib 12B to the other metal panel P2 is smaller than the clearance S2 from the distal end portion of the lower intersection rib 14 to the other metal panel P2.

Note that, as illustrated in FIG. 4, in the body side panel BP of this embodiment, the clearance W1 between both the metal panels P1 and P2 in the sill portion SL is larger than the clearance W2 between both the metal panels P1 and P2 in the center pillar portion CP. In such a structure, size relationships between the clearances (S1 and S2) from the distal end portions of the ribs to the other metal panel P2 may be partially inverted depending on size relationships between the clearances (W1 and W2) between the metal panels P1 and P2. As a countermeasure, it is more desirable that the size relationships between the clearances (S1 and S2) from the distal end portions of the ribs to the other metal panel P2 be set in each of the sill portion SL and the center pillar portion CP.

In the body side panel BP having the above-described structure, the resin member R integrated with the one metal panel P1 includes the link ribs (11A, 11B, 12A, 12B, 13A, and 13B) that continuously extend respectively along the front edge and the rear edge of the center pillar portion CP, along the upper edge and the lower edge of the sill portion SL, and along the upper edge and the lower edge of the roof side portion RS. In other words, the link ribs (11A, 11B, 12A, 12B, 13A, and 13B) of the resin member R are arranged continuously over a longitudinal direction of a frame including the center pillar portion CP, the sill portion SL, and the roof side portion RS, that is, form what is called a monocoque structure.

In the body side panel BP, in case of side collision, due to the structure of the vehicle body, high impact energy is applied mainly in a lower range of the center pillar portion CP. Specifically, in the body side panel BP in an assembly of the vehicle body, cross members bridged in a right-and-left direction of the vehicle body are present respectively at a lower end portion (Q1) in the front pillar portion FP and a lower end portion (Q2) in the rear pillar portion RP illustrated in FIG. 2. Thus, in the body side panel BP, the lower end portions of the front pillar portion FP and the rear pillar portion RP are reinforced on a vehicle-body side against the side collision. In contrast, the lower end portion of the center pillar portion CP is lower in degree of reinforcement on the vehicle-body side than the other pillar portions FP and RP. Thus, the high impact energy is applied in the lower range.

In a case where the body side panel BP receives impact from an outside, an entirety of the monocoque structure constituted by the link ribs (11A, 11B, 12A, 12B, 13A, and 13B) receives energy of the impact. In this case, in the structure of the body side panel BP, the clearance S1 from the distal end portion of each of the link ribs (11A, 11B, 12A, 12B, 13A, and 13B) to the other metal panel P2 has been set smaller than the clearance S2 from the distal end portion of each of the intersection ribs (14 and 15) to the other metal panel P2.

Thus, in the body side panel BP, the impact energy is received by the monocoque structure, and both the metal panels are deformed. In conjunction therewith, the link ribs (11A, 11B, 12A, 12B, 13A, and 13B) nearer the other metal panel P deform or collapse first by striking against the other metal panel P2 so as to primarily absorb (release) the impact energy. Then, in the body side panel BP, the intersection ribs (14 and 15) of the resin member R deform or collapse by striking against the other metal panel P2 so as to secondarily absorb (release) the impact energy.

In such a way, the body side panel BP is not only lightweight due to the reinforcement of the one metal panel P1 and the other metal panel P2 with the resin member R, but also absorbs the impact energy by the side collision in two steps. With this, an impact absorbing function can be enhanced. Further, in the body side panel BP of this embodiment, the similar rib structures are provided over and under the center pillar portion CP. Thus, the enhanced impact-absorbing function can be implemented not only at the lower end portion of the center pillar portion CP, to which the high impact energy is applied, but also both over and under the center pillar portion CP. As a result, contribution to increases in overall rigidity and safety can be made.

Still further, in the body side panel BP, the upper end portions of the pillar front-link rib 11A and the pillar rear-link rib 11B are continuous with the roof lower-link rib 13B, and the lower end portions of the pillar front-link rib 11A and the pillar rear-link rib 11B are continuous with the sill upper-link rib 12A. With this, in the body side panel BP, the enhanced impact-absorbing function can be secured, and in addition, the overall rigidity can be further increased.

Yet further, in the body side panel BP, the sill upper-link rib 12A and the sill lower-link rib 12B of the sill portion SL continuously extend over the range from the lower end portion of the front pillar portion FP to the lower end portion of the rear pillar portion RP via the lower end portion of the center pillar portion CP. This enables the body side panel BP to suppress deformation of the sill portion SL in case of the side collision.

In other words, in case where the body side panel BP is subjected to the side collision without the continuous ribs, in conjunction with the deformation of the sill portion SL to the inner side of the vehicle body, a front end side of the sill portion SL may be buckled to flip up as indicated by an arrow B in FIG. 2. As a countermeasure, in the body side panel BP, not only is the enhanced impact-absorbing function secured, but also rigidity of the sill portion SL is increased by continuously providing the sill upper-link rib 12A and the sill lower-link rib 12B all over the front-and-rear direction of the vehicle body. With this, the sill portion is prevented from being buckled.

In addition, the body side panel BP employs the lower intersection rib 14 and the upper intersection rib 15 including the at least one circular-arc intersection rib 14A and the at least one circular-arc intersection rib 15A each having the convex curved surface on the side where the center pillar portion CP is present, and the at least one straight intersection rib 14B and the at least one straight intersection rib 15B each arranged radially from the center of the convex curved surface. This enables the body side panel BP not only to secure the enhanced impact-absorbing function but also to bear load on the upper end portion and the lower end portion of the center pillar portion CP in a distributed manner with its entirety. In other words, the body side panel BP is capable of securing, with use of the requisite minimum number of the intersection ribs 14 and 15, strength and rigidity that are necessary against impact energy that cannot be fully absorbed by the link ribs (11A, 11B, 12A, 12B, 13A, and 13B).

In the body side panel BP according to the present invention, the resin member R is not limited in particular as long as the resin member R is applicable to body side panels for automobiles. As examples of the resin member R, there may be mentioned fiber reinforced resins such as a carbon-fiber reinforced resin and a glass-fiber reinforced resin. As a preferred example of the carbon-fiber reinforced resin, from viewpoints of increasing the overall rigidity of the body side panel and of weight reduction of the same, there may be mentioned a carbon-fiber-reinforced thermoplastic resin (CFRTP).

As examples of carbon fiber contained in the carbon-fiber-reinforced thermoplastic resin, there may be mentioned a regular tow formed of filaments each including approximately 1,000 to 24,000 monofilaments, and a large tow formed of filaments each including 40,000 or more monofilaments. Alternatively, a recycled material or a non-woven fabric also may be used.

As examples of resins contained in the carbon-fiber-reinforced thermoplastic resin, there may be mentioned polyamide (PA6), polyamide 66 (PA66), polypropylene (PP), polyether ether ketone (PEEK), polyphenylene sulfide (PPS), meta-xylene diamine 6 (MXD6), and polynonamethylene terephthalamide (PA9T).

The body side panel BP of the present invention is featured in that the thermoplastic resin containing the discontinuous carbon fiber as the reinforcing material is used as the resin member R. Thus, the resin member R can be easily integrated with the one metal panel P1 by injection molding or resin-press molding. Further, the discontinuous fiber used in the resin member R of the body side panel BP is relatively long, and hence strength and rigidity can be further increased. Still further, the resin member R of the body side panel BP can be molded integrally with the one metal panel P1 by injection molding or press-molding. Thus, a production cycle time is reduced, and a degree of freedom in designing the ribs is increased.

FIG. 5 to FIG. 16 are explanatory views of body side panels according to a second embodiment to an eighth embodiment of the present invention. FIG. 5, FIG. 7, FIG. 9, FIG. 11, and FIG. 13 are each a cross-sectional view of the roof side portion and the center pillar portion, which is taken along the arrows A-A in FIG. 2. FIG. 6, FIG. 8, FIG. 10, FIG. 12, and FIG. 14 are each another cross-sectional view of the center pillar portion and the sill portion, which is taken along the arrows B-B in FIG. 2. Hereinbelow, in each of the embodiments, the same components as those in the first embodiment are denoted by the same reference symbols to omit redundant description.

Second Embodiment

Figure 5:
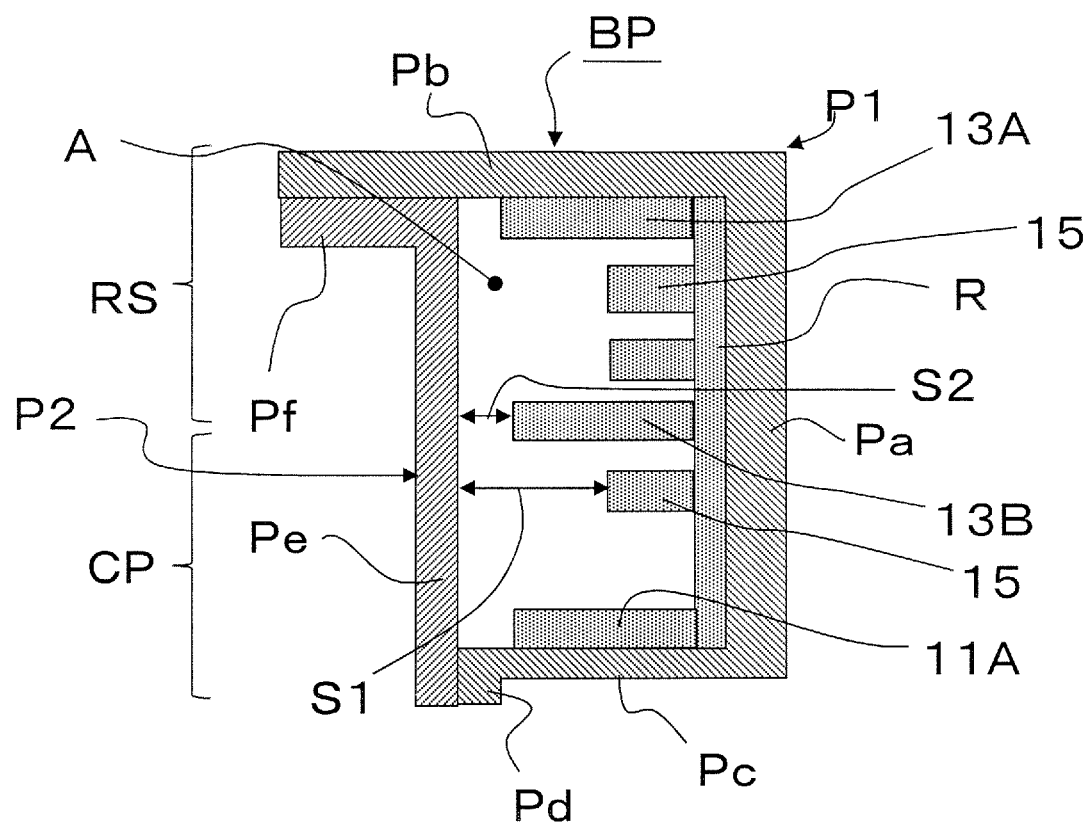
FIG. 5 is a cross-sectional view of a second embodiment, which is taken along the arrows A-A in FIG. 2.
Figure 6:
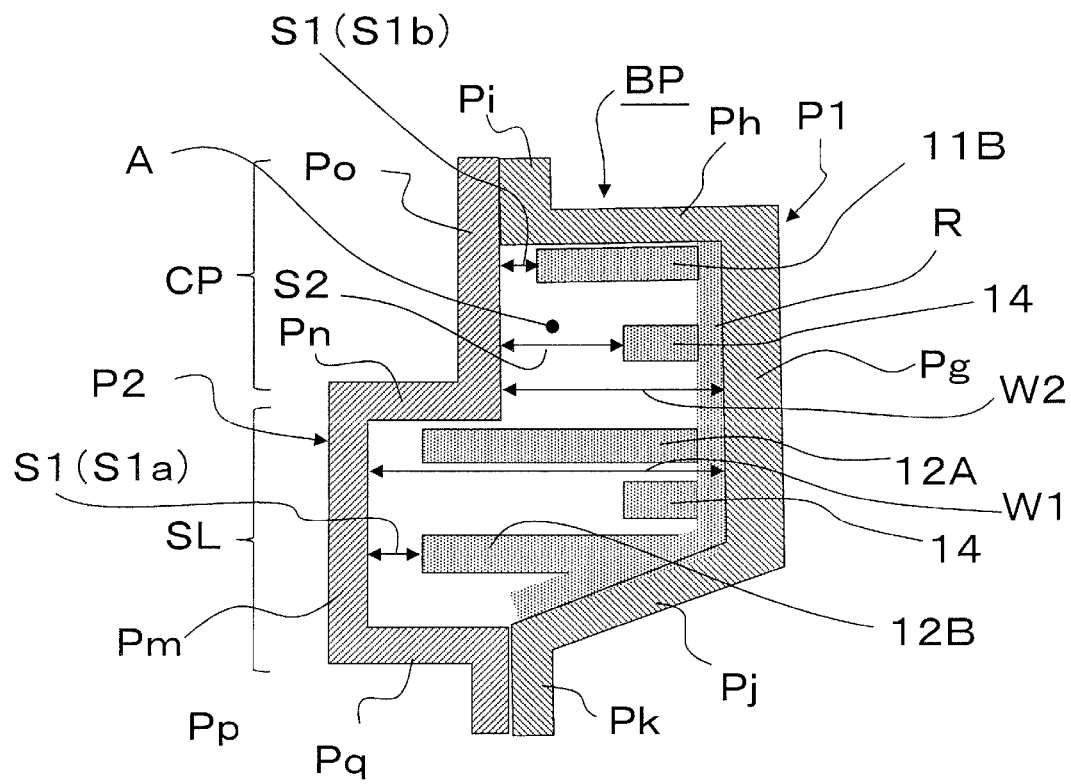
FIG. 6 is another cross-sectional view of the second embodiment, which is taken along the arrows B-B in FIG. 2.

In the structure of the body side panel BP, a main part of which is illustrated in FIG. 5 and FIG. 6, as illustrated particularly in FIG. 6, the clearance W1 between the one metal panel P1 and the other metal panel P2 in the sill portion SL (width of the space A) is larger than the clearance W2 between the one metal panel P1 and the other metal panel P2 in the center pillar portion CP.

In addition, in the structure of the body side panel BP, with regard to the resin member R, the clearance from the distal end portion of each of the link ribs in the sill portion Sl to the other metal panel is larger than the clearance from the distal end portion of each of the link ribs in the center pillar portion to the other metal panel.

More specifically, as illustrated in FIG. 6, in the body side panel BP, the clearance S1 (S1a) from the distal end portion of each of the sill upper-link rib 12A and the sill lower-link rib 12B to the other metal panel P2 is larger than the clearance S1 (S1b) from the distal end portion of the pillar rear-link rib 11B to the other metal panel P2. In the illustrated example, the sill upper-link rib 12A and the sill lower-link rib 12B each have the protrusion dimension L1 of protruding beyond the upper flange portion Po of the other metal panel P2. The pillar rear-link rib 11B does not reach the upper flange portion Po of the other metal panel P2, and hence is shorter than the sill upper-link rib 12A and the sill lower-link rib 12B.

In case of side collision, in the body side panel BP configured in this way, impact is received by the sill portion Sl, and its entirety is uniformly deformed. Energy of the impact is absorbed by the sill upper-link rib 12A and the sill lower-link rib 12B, and then the energy of the impact is absorbed by the pillar rear-link rib 11B. In addition, the energy of the impact is absorbed by the lower intersection rib 14. In such a way, the body side panel BP is not only capable of implementing the impact absorbing function as in the foregoing embodiment, but also is featured in being capable of suppressing local deformation of the sill portion SL by reliably receiving force of the impact with the sill portion SL.

Third Embodiment

Figure 7:
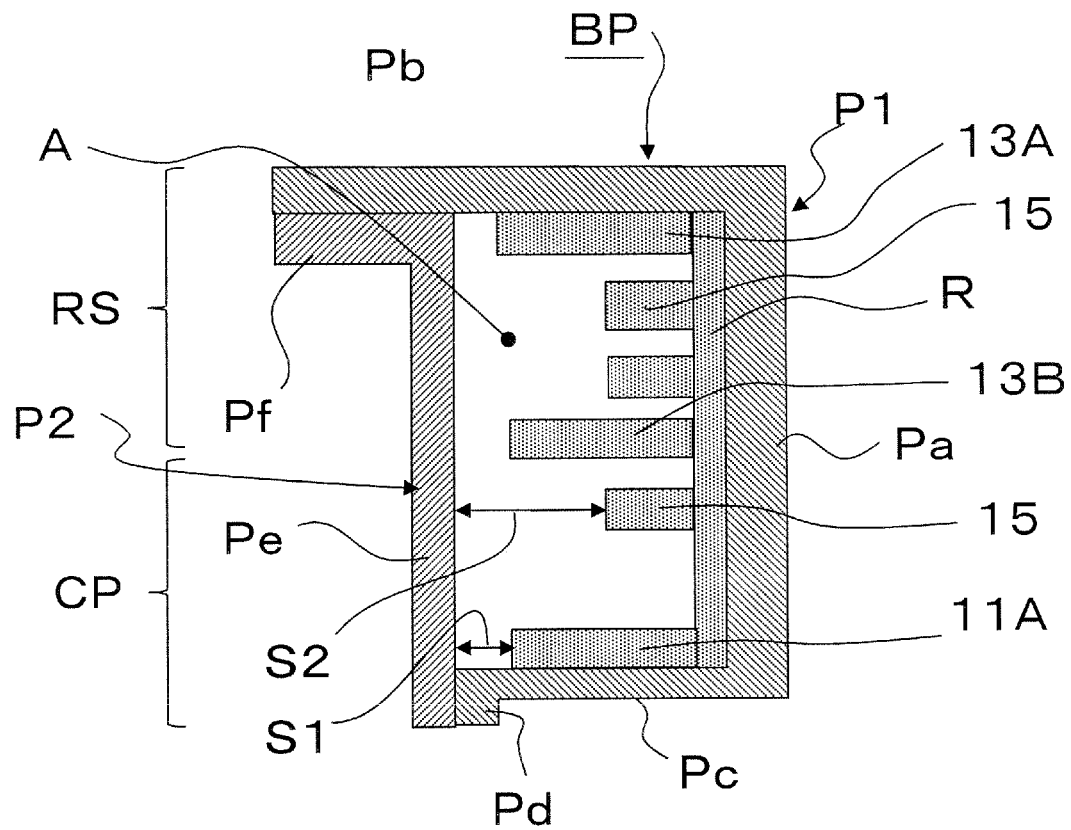
FIG. 7 is a cross-sectional view of a third embodiment, which is taken along the arrows A-A in FIG. 2.
Figure 8:
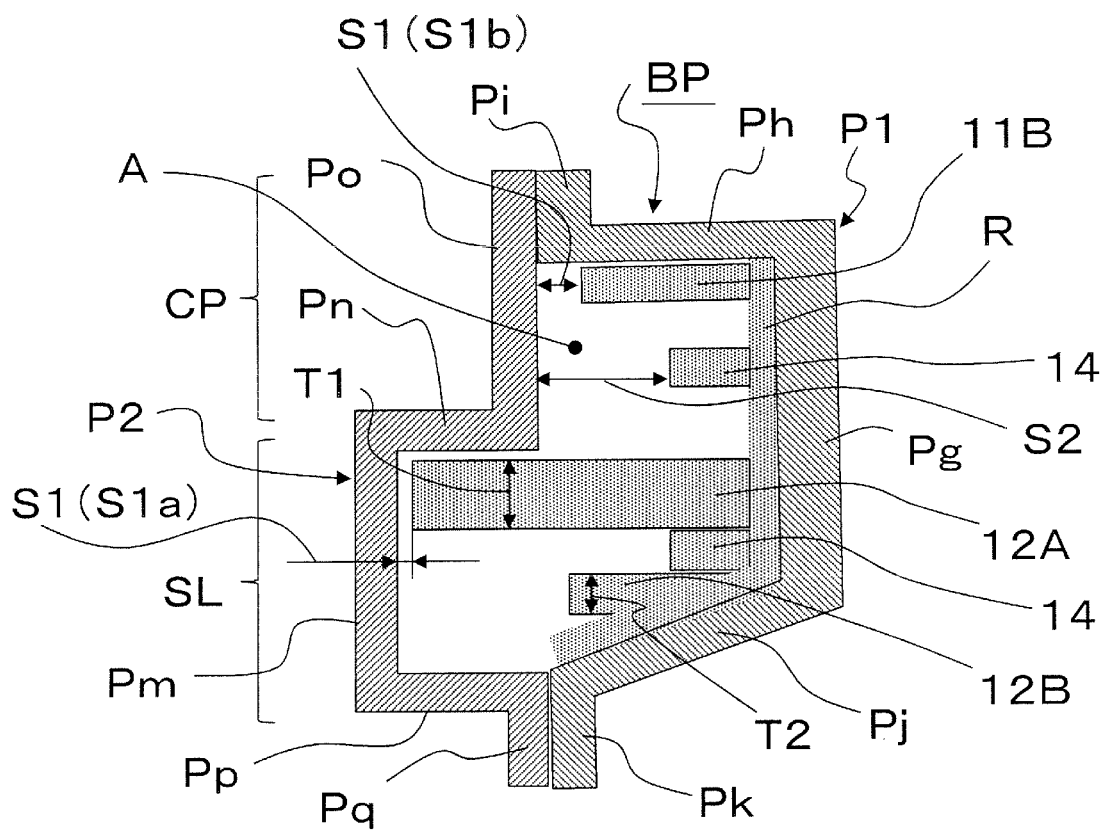
FIG. 8 is another cross-sectional view of the third embodiment, which is taken along the arrows B-B in FIG. 2.

In the structure of the body side panel BP, a main part of which is illustrated in FIG. 7 and FIG. 8, one or more of the respective clearances from the distal end portions of the link ribs of the resin member R to the other metal panel P1 is different from other ones of the respective clearances. One or more of respective thickness dimensions of these link ribs is different from other ones of the respective thickness dimensions. In addition, the thickness dimensions become larger as the clearances become smaller.

More specifically, as illustrated particularly in FIG. 8, in the body side panel BP of this embodiment, the sill upper-link rib 12A has a width dimension T1 that is larger than a width dimension T2 of each of the other link ribs 11B and 12B. The clearance S1 (S1a) from the distal end portion of this sill upper-link rib 12A to the other metal panel P2 is smaller than the clearance S1 (S1b) from each of the other link ribs 11B and 12B.

In case of side collision, in the body side panel BP configured in this way, the sill upper-link rib 12A with the largest width dimension T1 strikes against the other metal panel P2 first, and absorbs initial impact energy. In this way, the body side panel BP is not only capable of implementing the impact absorbing function as in the foregoing embodiments, but also is featured in being capable of receiving high force of the initial impact. Note that, although the sill upper-link rib 12A has the large width dimension T1 in the above-description of this embodiment, as a matter of course, another one of the link ribs may be selected and similarly configured.

Fourth Embodiment

Figure 9:
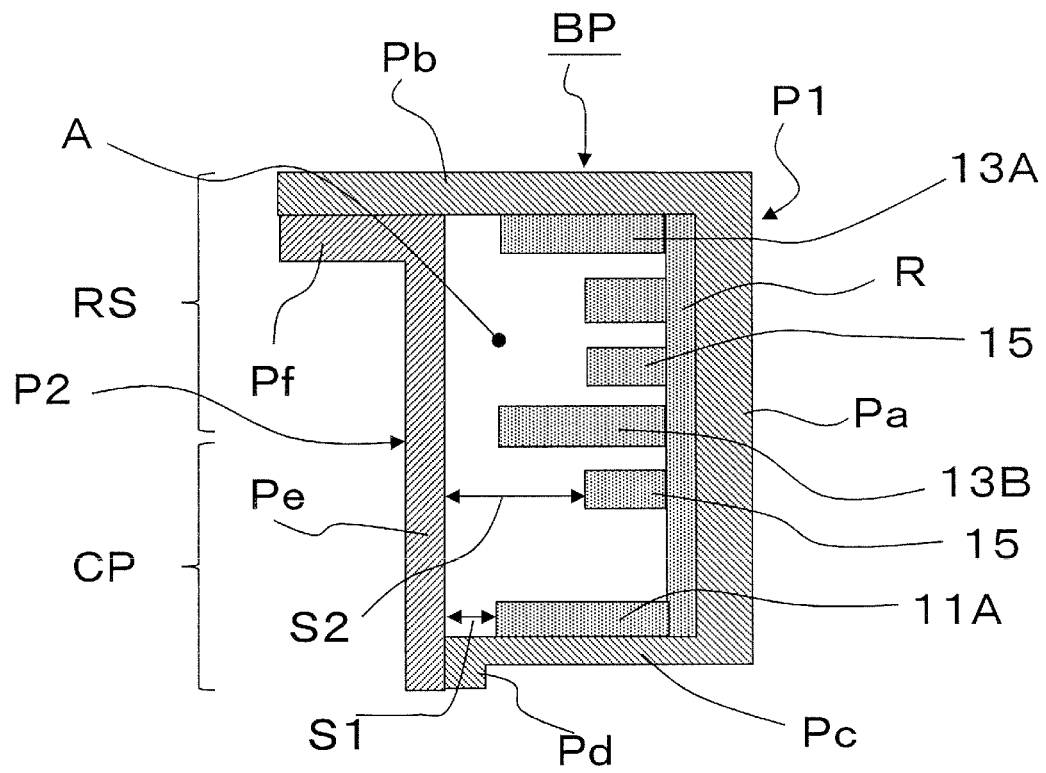
FIG. 9 is a cross-sectional view of a fourth embodiment, which is taken along the arrows A-A in FIG. 2.
Figure 10:
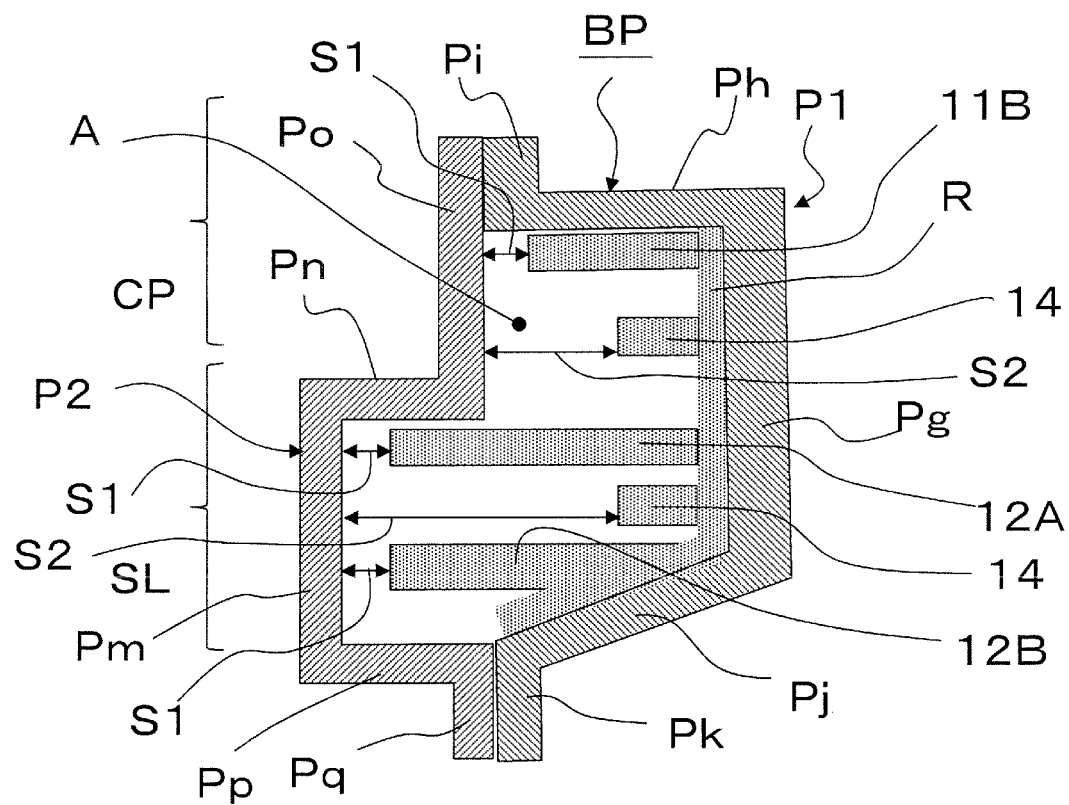
FIG. 10 is another cross-sectional view of the fourth embodiment, which is taken along the arrows B-B in FIG. 2.

In the structure of the body side panel BP, a main part of which is illustrated in FIG. 9 and FIG. 10, the respective clearances S1 from the distal end portions of the link ribs of the resin member R to the other metal panel P2 are set equal to each other.

More specifically, in the body side panel BP of this embodiment, the respective clearances S1 from the distal end portions of the roof upper-link rib 13A, the roof lower-link rib 13B, and the pillar front-link rib 11A that are illustrated in FIG. 9, and from those of the pillar rear-link rib 11B, the sill upper-link rib 12A, and the sill lower-link rib 12B that are illustrated in FIG. 10 to the other metal panel P2 are equal to each other.

In case of side collision, in the body side panel BP configured in this way, the roof upper-link rib 13A, the roof lower-link rib 13B, the pillar front-link rib 11A, the pillar rear-link rib 11B, the sill upper-link rib 12A, and the sill lower-link rib 12B bear initial impact simultaneously with each other in a distributed manner. Then, the upper intersection rib 15 and the lower intersection rib 14 absorb secondary impact. In this way, the body side panel BP is not only capable of implementing the impact absorbing function as in the foregoing embodiments, but also is featured in being capable of receiving the high force of the initial impact.

Fifth Embodiment

Figure 11:
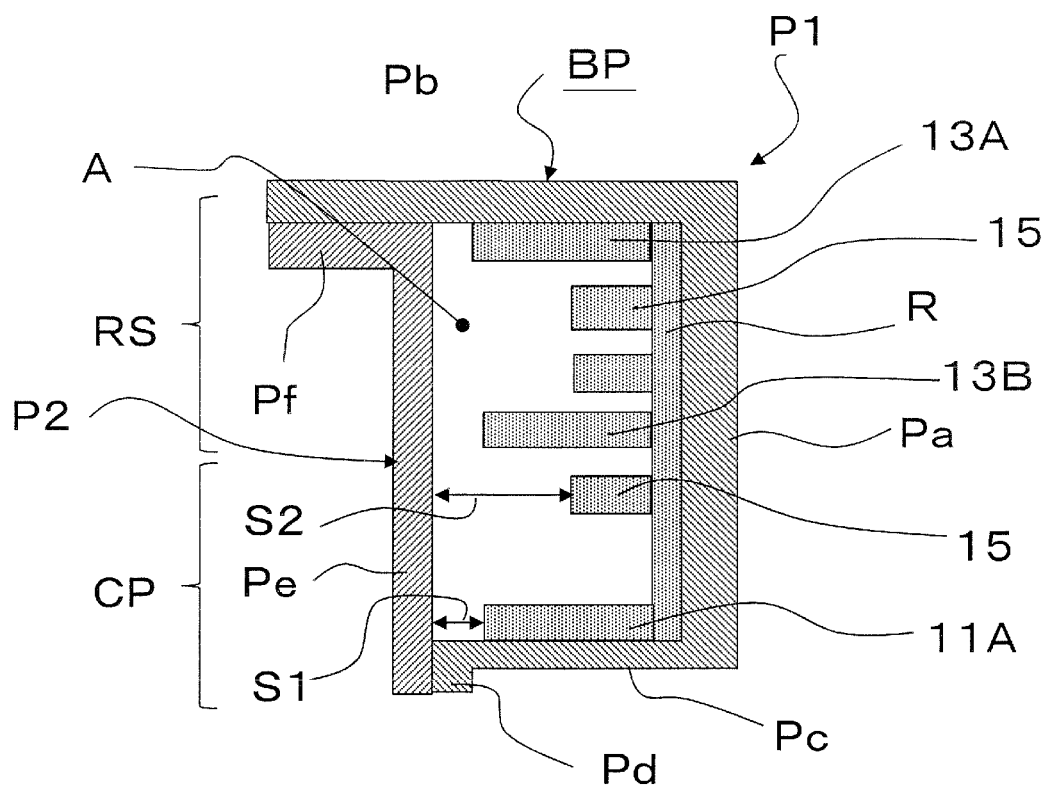
FIG. 11 is a cross-sectional view of a fifth embodiment, which is taken along the arrows A-A in FIG. 2.
Figure 12:
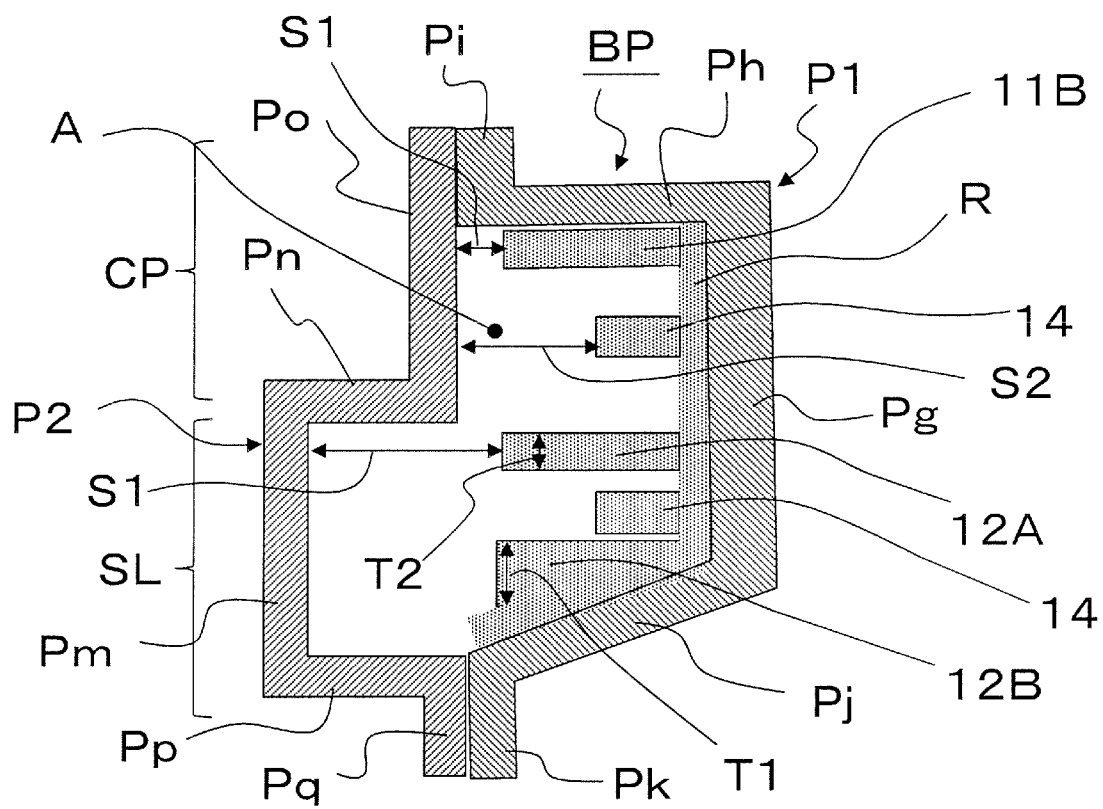
FIG. 12 is another cross-sectional view of the fifth embodiment, which is taken along the arrows B-B in FIG. 2.

In the structure of the body side panel BP, a main part of which is illustrated in FIG. 11 and FIG. 12, the thickness dimension T1 of the sill lower-link rib 12B of the resin member R is larger than the thickness dimension T2 of each of the other link ribs.

In case of side collision, in the body side panel BP configured in this way, the sill lower-link rib 12B mainly absorbs the initial impact, and then the upper intersection rib 15 and the lower intersection rib 14 absorb the secondary impact. In this way, the body side panel BP is not only capable of implementing the impact absorbing function as in the foregoing embodiments, but also is featured in being capable of more advantageously absorbing the high force of the initial impact.

Sixth Embodiment

Figure 13:
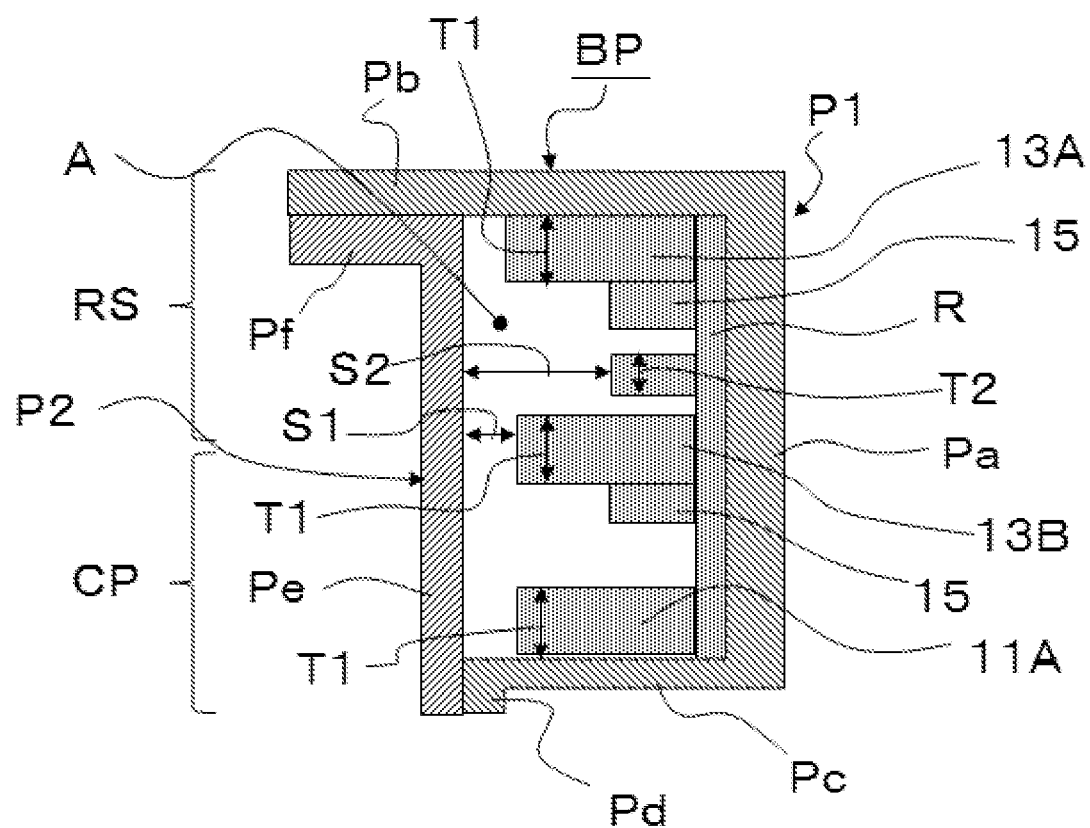
FIG. 13 is a cross-sectional view of a sixth embodiment, which is taken along the arrows A-A in FIG. 2.
Figure 14:
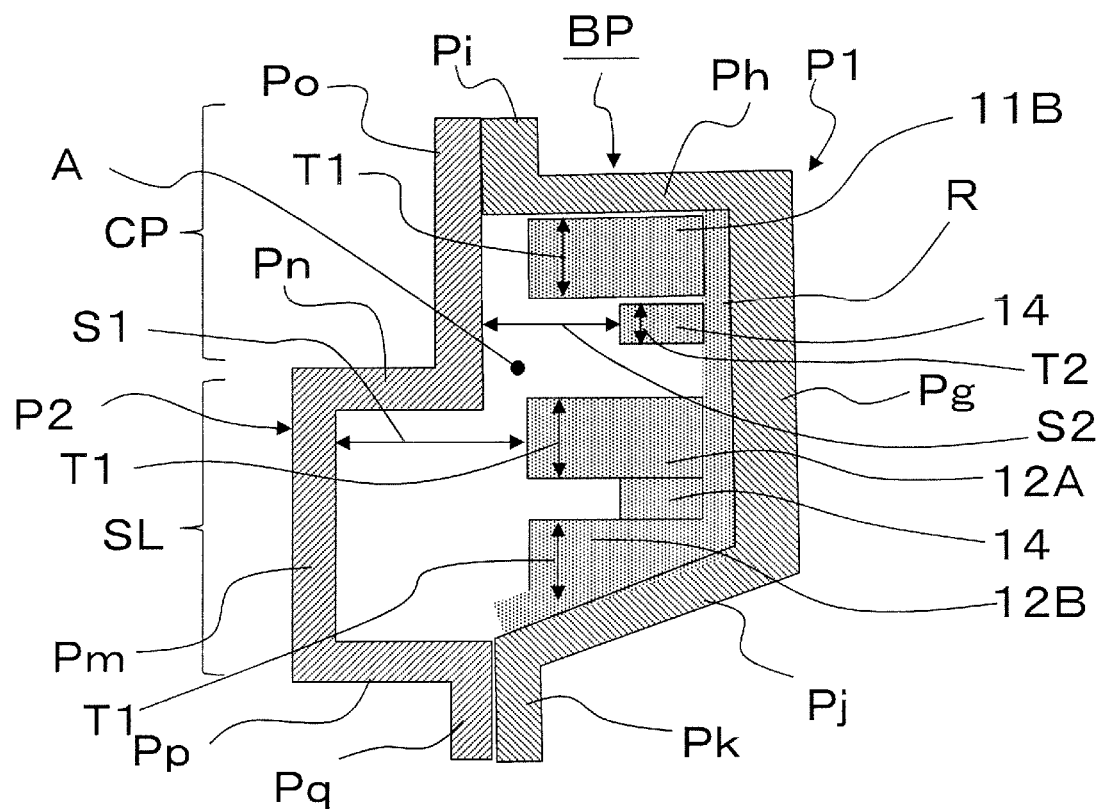
FIG. 14 is another cross-sectional view of the sixth embodiment, which is taken along the arrows B-B in FIG. 2.

In the structure of the body side panel BP, a main part of which is illustrated in FIG. 13 and FIG. 14, the thickness dimension of each of the link ribs of the resin member R is larger than the thickness dimension of each of the intersection ribs.

More specifically, in the body side panel BP of this embodiment, the thickness dimension T1 of each of the roof upper-link rib 13A, the roof lower-link rib 13B, and the pillar front-link rib 11A that are illustrated in FIG. 13, and of each of the pillar rear-link rib 11B, the sill upper-link rib 12A, and the sill lower-link rib 12B that are illustrated in FIG. 14 is larger than the thickness dimension T2 of each of the upper intersection rib 15 and the lower intersection rib 14.

In case of side collision, in the body side panel BP configured in this way, the thickness dimension T1 of each of the roof upper-link rib 13A, the roof lower-link rib 13B, the pillar front-link rib 11A, the pillar rear-link rib 11B, the sill upper-link rib 12A, and the sill lower-link rib 12B that strike against the other metal panel P2 first is large, and hence these link ribs reliably absorb the initial heavy impact. Then, the upper intersection rib 15 and the lower intersection rib 14 absorb the secondary impact. In this way, the body side panel BP is not only capable of implementing the impact absorbing function as in the foregoing embodiments, but also is featured in being capable of more advantageously absorbing the high force of the initial impact.

Seventh Embodiment

Figure 15:
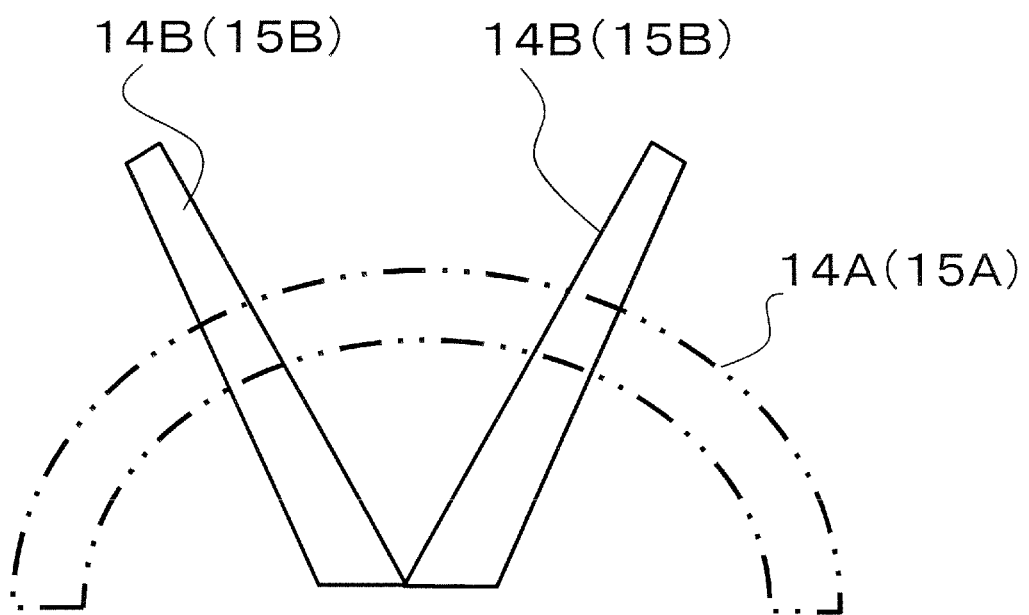
FIG. 15 is an explanatory view of intersection ribs according to a seventh embodiment of the present invention.

The structure of the body side panel BP, a main part of which is illustrated in FIG. 15, is featured in that, of thickness dimensions of the circular-arc intersection ribs 14A and 15A and the straight intersection ribs 14B and 15B of the intersection ribs 14 and 15 of the resin member R, the thickness dimension of each of the straight intersection ribs 14B and 15B is gradually reduced from the center of the convex curved surface toward a distal end portion of each of the straight intersection ribs 14B and 15B.

In case of side collision, in the body side panel BP configured in this way, the thickness dimension of each of the straight intersection ribs 14B and 15B is gradually reduced from the center of the convex curved surface toward the distal end portion, that is, from an outermost portion of the panel to the inner inside. This is because load to be applied from the outside is maximum at the outermost portion of the panel, and is distributed toward an inside of the panel. In this way, the body side panel BP is not only capable of implementing the impact absorbing function as in the foregoing embodiments, but also is featured in being capable of reducing volume of all the ribs to a requisite minimum while maintaining strength that is necessary for the intersection ribs 14 and 15. As a result, contribution to further weight reduction can be made.

Eighth Embodiment

Figure 16:
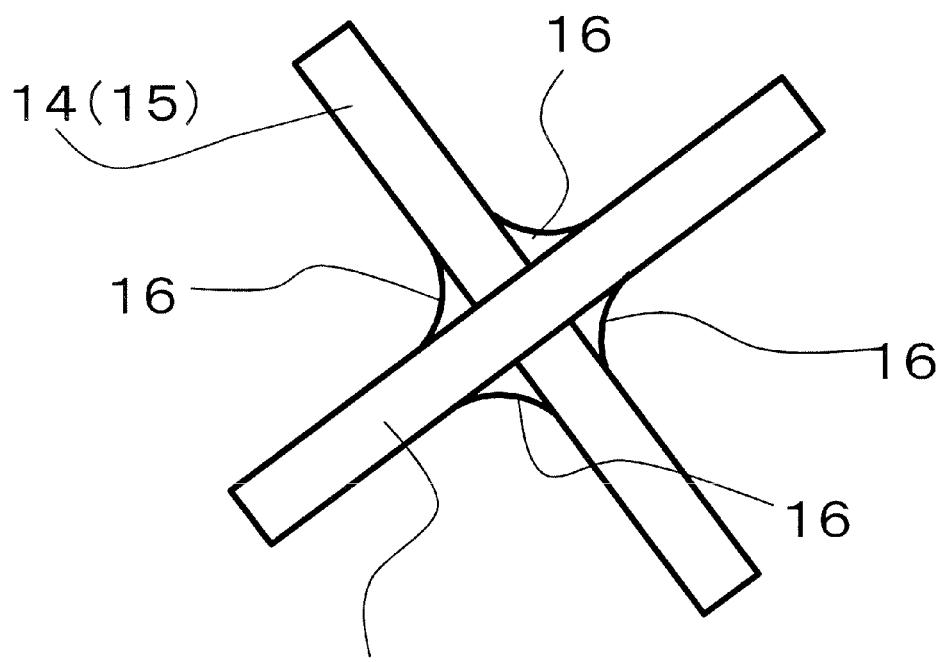
FIG. 16 is a main-part explanatory view of an eighth embodiment of the present invention.

In the structure of the body side panel BP, a main part of which is illustrated in FIG. 16, the link ribs 11A, 11B, 12A, 12B, 13A, and 13B of the resin member R each include thick corner portions 16 that increase thickness dimensions at each intersection part where the link rib 11A, 11B, 12A, 12B, 13A, or 13B intersects with the intersection rib 14 or 15. In this embodiment, the thick corner portions 16 are provided at four positions at each of the intersection parts.

The body side panel BP configured in this way is not only capable of implementing the impact absorbing function as in the foregoing embodiments, but also is featured in that the overall rigidity is increased by rigidly joining the ribs to each other with the thick corner portions 16 provided at each of the intersection parts where the link ribs and the intersection ribs intersect with each other. In other words, in the body side panel BP, force of coupling the ribs to each other is further increased, and hence desired strength can be maintained even when the thickness dimensions of the ribs are reduced. Thus, the contribution to further weight reduction can be made.

Configurations of the body side panel according to the present invention are not limited to those of the foregoing embodiments, and may be modified as appropriate within the gist of the present invention. In addition, the structures described in the embodiments may be selectively combined with each other. In the configurations exemplified in the foregoing embodiments, impact is absorbed in two steps by the link ribs and the intersection ribs. However, it is theoretically possible to implement the impact absorbing function in more than two steps by adjusting the lengths and the width dimensions of the ribs. Note that, even with the configurations of the foregoing embodiments, the body side panel according to the present invention is capable of sufficiently absorb the impact in case of side collision in the two steps.

In addition, if the body side panel according to the present invention is applied to a type that front and rear doors are arranged as illustrated in FIG. 2, the link ribs may be provided along the front pillar portion and the rear pillar portion, and the intersection ribs may be provided in intersection regions where these link ribs and the sill portion SL or the roof side portion intersect with each other. The body side panel according to the present invention is applicable also to a type that a single door is arranged on one side.

REFERENCE SIGNS LIST

A Space
BP Body side panel
FP Front pillar portion
P1 One metal panel
P2 Another metal panel
R Resin member
RP Rear pillar portion
RS Roof side portion
SP Center pillar portion
SL Sill portion
11A Pillar front-link rib
11B Pillar rear-link rib
12A Sill upper-link rib
12B Sill lower-link rib
13A Roof upper-link rib 13B Roof lower-link rib
14 Lower intersection rib
14A Circular-arc intersection rib
14B Straight intersection rib
15 Upper intersection rib
15A Circular-arc intersection rib
15B Straight intersection rib
16 Thick corner portion

The invention claimed is:

1. A body side panel comprising:
a center pillar portion that extends in a body upper-and-lower direction;
a sill portion that extends in a body front-and-rear direction across a first lower end portion of the center pillar portion;
a first metal panel that forms a first main surface of the body side panel;
a second metal panel that forms a second main surface of the body side panel, and that forms a space between the first metal panel and the second metal panel; and
a resin member that is molded integrally with the first metal panel in the space, the resin member comprising:
a first link rib that continuously extends along a front edge of the center pillar portion, the first link rib protruding from a first side where the first metal panel is present toward a second side where the second metal panel is present,
a second link rib that continuously extends along a rear edge of the center pillar portion, the second link rib protruding from the first side toward the second side,
a third link rib that continuously extends along a first upper edge of the sill portion through a first intersection region where the first upper edge and the first lower end portion intersect with each other, the third link rib protruding from the first side toward the second side,
a fourth link rib that continuously extends along a first lower edge of the sill portion through a second intersection region where the first lower edge and the first lower end portion intersect with each other, the fourth link rib protruding from the first side toward the second side, and
a lower intersection rib that is arranged in a third intersection region where the first lower end portion and the sill portion intersect with each other;
wherein a first clearance is provided from a first distal end portion of the first link rib to the second metal panel;
wherein a second clearance is provided from a second distal end portion of the second link rib to the second metal panel;
wherein a third clearance is provided from a third distal end portion of the third link rib to the second metal panel;
wherein a fourth clearance is provided from a fourth distal end portion of the fourth link rib to the second metal panel;
wherein a fifth clearance is provided from a fifth distal end portion of the lower intersection rib to the second metal panel;
wherein the first clearance is smaller than the fifth clearance;
wherein the second clearance is smaller than the fifth clearance;
wherein the third clearance is smaller than the fifth clearance; and
wherein the fourth clearance is smaller than the fifth clearance.

2. The body side panel of claim 1, further comprising a roof side portion that extends in the body front-and-rear direction across a first upper end portion of the center pillar portion;
wherein the resin member further comprises: a fifth link rib that continuously extends along a second upper edge through a fourth intersection region where the second upper edge and the first upper end portion intersect with each other, the fifth link rib protruding from the first side toward the second side,
a sixth link rib that continuously extends along a second lower edge of the roof side portion through a fifth intersection region where the second lower edge and the first upper end portion intersect with each other, the sixth link rib protruding from the first side toward the second side, and
an upper intersection rib that is arranged in a sixth intersection region where the roof side portion and the first upper end portion intersect with each other, the upper intersection rib protruding from the first side toward the second side;
wherein a sixth clearance is provided from a sixth distal end portion of the fifth link rib to the second metal panel;
wherein a seventh clearance is provided from a seventh distal end portion of the sixth link rib to the second metal panel;
wherein an eighth clearance is provided from an eight distal end portion of the upper intersection rib to the second metal panel;
wherein the sixth clearance is smaller than the eighth clearance; and
wherein the seventh clearance is smaller than the eighth clearance.

3. The body side panel of claim 2,
wherein the sixth link rib is continuous with a second upper end portion of the first link rib, and is continuous with a third upper end portion of the second link rib, and
wherein the third link rib that continuously extends along the first upper edge is continuous with a second lower end portion of the first link rib, and is continuous with a third lower end portion of the second link rib.

4. The body side panel of claim 1, wherein:
a sixth clearance is provided between the first metal panel and the second metal panel in the sill portion;
a seventh clearance is provided between the first metal panel and the second metal panel in the center pillar portion;
the sixth clearance is larger than the seventh clearance;
the third clearance is larger than the first clearance and is larger than the second clearance; and
the fourth clearance is larger than the first clearance and is larger than the second clearance.

5. The body side panel of claim 2, wherein:
at least one of:
the first clearance is different from at least one of the second clearance, the third clearance, the fourth clearance, the sixth clearance, or the seventh clearance,
the second clearance is different from at least one of the first clearance, the third clearance, the fourth clearance, the sixth clearance, or the seventh clearance,
the third clearance is different from at least one of the first clearance, the second clearance, the fourth clearance, the sixth clearance, or the seventh clearance, the fourth clearance is different from at least one of the first clearance, the second clearance, the third clearance, the sixth clearance, or the seventh clearance, the sixth clearance is different from at least one of the first clearance, the second clearance, the third clearance, the fourth clearance, or the seventh clearance, or the seventh clearance is different from at least one of the first clearance, the second clearance, the third clearance, the fourth clearance, or the sixth clearance;

the first link rib has a first thickness dimension;
the second link rib has a second thickness dimension;
the third link rib has a third thickness dimension;
the fourth link rib has a fourth thickness dimension;
the fifth link rib has a fifth thickness dimension;
the sixth link rib has a sixth thickness dimension; and
at least one of:

the first thickness dimension is different from at least one of the second thickness dimension, the third thickness dimension, the fourth thickness dimension, the fifth thickness dimension, or the sixth thickness dimension, the second thickness dimension is different from at least one of the first thickness dimension, the third thickness dimension, the fourth thickness dimension, the fifth thickness dimension, or the sixth thickness dimension, the third thickness dimension is different from at least one of the first thickness dimension, the second thickness dimension, the fourth thickness dimension, the fifth thickness dimension, or the sixth thickness dimension, the fourth thickness dimension is different from at least one of the first thickness dimension, the second thickness dimension, the third thickness dimension, the fifth thickness dimension, or the sixth thickness dimension, the fifth thickness dimension is different from at least one of the first thickness dimension, the second thickness dimension, the third thickness dimension, the fourth thickness dimension, or the sixth thickness dimension, or the sixth thickness dimension is different from at least one of the first thickness dimension, the second thickness dimension, the third thickness dimension, the fourth thickness dimension, or the fifth thickness dimension.

6. The body side panel of claim 2, wherein the first clearance, the second clearance, the third clearance, the fourth clearance, the sixth clearance, and the seventh clearance are equal.

7. The body side panel of claim 2, wherein:
the fourth link rib has a first thickness dimension;
the first link rib has a second thickness dimension;
the second link rib has a third thickness dimension;
the third link rib has a fourth thickness dimension;
the fifth link rib has a fifth thickness dimension;
the sixth link rib has a sixth thickness dimension; and
the first thickness dimension is larger than the second thickness dimension, the third thickness dimension, the fourth thickness dimension, the fifth thickness dimension, and the sixth thickness dimension.

8. The body side panel of claim 2, wherein:
the first link rib has a first thickness dimension;
the second link rib has a second thickness dimension;
the third link rib has a third thickness dimension;
the fourth link rib has a fourth thickness dimension;
the fifth link rib has a fifth thickness dimension;
the sixth link rib has a sixth thickness dimension;
the lower intersection rib has a seventh thickness dimension;
the upper intersection rib has an eighth thickness dimension;
the first thickness dimension is larger than the seventh thickness dimension and is greater than the eighth thickness dimension;
the second thickness dimension is larger than the seventh thickness dimension and is greater than the eighth thickness dimension;
the third thickness dimension is larger than the seventh thickness dimension and is greater than the eighth thickness dimension;
the fourth thickness dimension is larger than the seventh thickness dimension and is greater than the eighth thickness dimension;
the fifth thickness dimension is larger than the seventh thickness dimension and is greater than the eighth thickness dimension; and
the sixth thickness dimension is larger than the seventh thickness dimension and is greater than the eighth thickness dimension.

9. The body side panel of claim 1, further comprising a front pillar portion and a rear pillar portion that extend in the body upper-and-lower direction;
wherein the third link rib and the fourth link rib continuously extend over a range from a second lower end portion of the front pillar portion toward a third lower end portion of the rear pillar portion.

10. The body side panel of claim 1, wherein:
the resin member further comprises an upper intersection rib that is arranged in a sixth intersection region where a roof side portion and the first upper end portion intersect with each other, the upper intersection rib protruding from the first side toward the second side;
the lower intersection rib comprises:
at least one first circular-arc intersection rib that has a first convex curved surface on a third side where the center pillar portion is present, and
at least one first straight intersection rib that is arranged radially from a first center of the first convex curved surface; and
the upper intersection rib comprises:
at least one second circular-arc intersection rib that has a second convex curved surface on the third side where the center pillar portion is present, and
at least one second straight intersection rib that is arranged radially from a second center of the second convex curved surface.

11. The body side panel of claim 10, wherein:
each of the at least one first straight intersection rib has a first thickness dimension that is gradually reduced from the first center toward a sixth distal end portion of the first straight intersection rib; and
each of the at least one second straight intersection rib has a second thickness dimension that is gradually reduced from the second center toward a seventh distal end portion of the second straight intersection rib.

12. The body side panel of claim 10, wherein:
the resin member further comprises:
a fifth link rib that continuously extends along a second upper edge through a fourth intersection region where the second upper edge and the first upper end portion intersect with each other, the fifth link rib protruding from the first side toward the second side, and a sixth link rib that continuously extends along a second lower edge of the roof side portion through a fifth intersection region where the second lower edge and the first upper end portion intersect with each other, the sixth link rib protruding from the first side toward the second side;

the first link rib includes a first thick corner portion that increases thickness dimensions at each first intersection part where the first link rib intersects with the lower intersection rib or the upper intersection rib;

the second link rib includes a second thick corner portion that increases thickness dimensions at each second intersection part where the second link rib intersects with the lower intersection rib or the upper intersection rib;

the third link rib includes a third thick corner portion that increases thickness dimensions at each third intersection part where the third link rib intersects with the lower intersection rib or the upper intersection rib;

the fourth link rib includes a fourth thick corner portion that increases thickness dimensions at each fourth intersection part where the fourth link rib intersects with the lower intersection rib or the upper intersection rib;

the fifth link rib includes a fifth thick corner portion that increases thickness dimensions at each fifth intersection part where the fifth link rib intersects with the lower intersection rib or the upper intersection rib; and the sixth link rib includes a sixth thick corner portion that increases thickness dimensions at each sixth intersection part where the sixth link rib intersects with the lower intersection rib or the upper intersection rib.

13. The body side panel of claim 1, wherein the resin member is a thermoplastic resin containing discontinuous carbon fiber as a reinforcing material.

* * * * *